US012633793B2

(12) United States Patent
Tamura et al.

(10) Patent No.: US 12,633,793 B2
(45) Date of Patent: May 19, 2026

(54) STATOR, METHOD FOR MANUFACTURING STATOR, AND BRUSHLESS MOTOR

(71) Applicant: Panasonic Intellectual Property Management Co., Ltd., Osaka (JP)

(72) Inventors: Hideki Tamura, Shiga (JP); Mitsumasa Mizuno, Osaka (JP); Yuya Ako, Osaka (JP); Kenji Okada, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 233 days.

(21) Appl. No.: 18/274,755

(22) PCT Filed: Dec. 20, 2021

(86) PCT No.: PCT/JP2021/046972
§ 371 (c)(1),
(2) Date: Jul. 28, 2023

(87) PCT Pub. No.: WO2022/172594
PCT Pub. Date: Aug. 18, 2022

(65) Prior Publication Data
US 2024/0097518 A1      Mar. 21, 2024

(30) Foreign Application Priority Data
Feb. 15, 2021      (JP) ................................. 2021-022082

(51) Int. Cl.
*H02K 3/38*          (2006.01)
*H02K 3/34*          (2006.01)
(Continued)

(52) U.S. Cl.
CPC .............. *H02K 3/38* (2013.01); *H02K 3/345* (2013.01); *H02K 15/022* (2013.01); *H02K 15/026* (2013.01)

(58) Field of Classification Search
CPC ........ H02K 3/522; H02K 15/022; H02K 3/38; H02K 1/148; H02K 21/16; H02K 15/026; H02K 1/2773; H02K 3/345
See application file for complete search history.

(56) References Cited

U.S. PATENT DOCUMENTS 9,667,114 B2     5/2017 Kazuhisa et al.
11,699,928 B2     7/2023 Kong
(Continued)

FOREIGN PATENT DOCUMENTS

JP        2003-018780 A      1/2003
JP        2003-111329 A      4/2003
(Continued)

OTHER PUBLICATIONS

KR-20190133523-A machine translation on May 14, 2025.*
(Continued)

*Primary Examiner* — Leda T Pham
(74) *Attorney, Agent, or Firm* — Renner, Otto, Boisselle & Sklar, LLP

(57)                ABSTRACT
A stator includes a plurality of stator blocks aligned in a circumferential direction and a plurality of coils each made of a winding wound around a corresponding one of the plurality of stator blocks. The stator includes a plurality of insulation members electrically insulating from the plurality of stator blocks from the plurality of coils for respective groups of the plurality of stator blocks and the plurality of coils. Each of the plurality of stator blocks includes a yoke portion located at its outermost perimeter, a teeth portion protruding from an inner peripheral surface of the yoke portion, and an insulating portion being electrically insulating and covering a surface of the teeth portion. Each of the plurality of insulation members includes a pair of insulating plates. Each of the pair of insulating plates has a width greater than a width of the teeth portion, and the pair of
(Continued)

insulating plates are arranged to face each other across the teeth portion.

15 Claims, 15 Drawing Sheets

(51) Int. Cl.

| | | |
|---|---|---|
| *H02K 15/022* | (2025.01) | |
| *H02K 15/026* | (2025.01) | |

(56) References Cited

U.S. PATENT DOCUMENTS

| | | | |
|---|---|---|---|
| 2004/0222715 A1 | 11/2004 | Yamamura et al. | |
| 2005/0229383 A1 | 10/2005 | Yamamura et al. | |
| 2011/0258840 A1 | 10/2011 | Urano et al. | |
| 2014/0035428 A1* | 2/2014 | Yuya | H02K 3/522 |
| | | | 310/216.057 |
| 2015/0256055 A1 | 9/2015 | Kino et al. | |
| 2017/0324295 A1* | 11/2017 | Tomonaga | H02K 1/02 |
| 2018/0006511 A1 | 1/2018 | Kong et al. | |
| 2019/0260255 A1 | 8/2019 | Kuwahara et al. | |
| 2020/0220415 A1 | 7/2020 | Hishida et al. | |
| 2023/0037924 A1 | 2/2023 | Jung et al. | |
| 2024/0097511 A1 | 3/2024 | Tamura et al. | |
| 2024/0097518 A1 | 3/2024 | Tamura et al. | |

FOREIGN PATENT DOCUMENTS

| | | | |
|---|---|---|---|
| JP | 2004-357491 A | | 12/2004 |
| JP | 2009-044853 A | | 2/2009 |
| JP | 2010-114998 A | | 5/2010 |
| JP | 2010-206887 A | | 9/2010 |
| JP | 2011259614 A | * | 12/2011 |
| JP | 2013-021880 A | | 1/2013 |
| JP | 2013-132110 A | | 7/2013 |
| JP | 2014-100016 A | | 5/2014 |
| JP | 2015-133808 A | | 7/2015 |
| JP | 2016-201866 A | | 12/2016 |
| JP | 2017-139838 A | | 8/2017 |
| KR | 20190133523 A | * | 12/2019 |
| WO | 2012/114508 A1 | | 8/2012 |
| WO | 2018/235564 A1 | | 12/2018 |
| WO | 2021/205708 A1 | | 10/2021 |

OTHER PUBLICATIONS

JP-2011259614-A machine translation on May 14, 2025.*
Extended European Search Report for corresponding Application No. 21925836.5, dated Jul. 11, 2024.
International Search Report for corresponding Application No. PCT/JP2021/046972, mailed Mar. 22, 2022.
Written Opinion for corresponding Application No. PCT/JP2021/046972, mailed Mar. 22, 2022.
International Search Report for related Application No. PCT/JP2021/046970, mailed Mar. 22, 2022.
Written Opinion for related Application No. PCT/JP2021/046970, mailed Mar. 22, 2022.
Co-Pending U.S. Appl. No. 18/274,753 (National Stage of PCT/JP2021/046970) to H. Tamura et al., entitled "Stator and Brushless Motor", filed Jul. 28, 2023.

* cited by examiner

STATOR, METHOD FOR MANUFACTURING STATOR, AND BRUSHLESS MOTOR

TECHNICAL FIELD

The present disclosure relates to stators, methods for manufacturing the stators, and brushless motors, and specifically, to a bobbinless-type stator, a method for manufacturing the bobbinless-type stator, and a brushless motor including the bobbinless-type stator.

BACKGROUND ART

As a conventional example, a stator of a rotary electric machine described in Patent Literature 1 is explained. The stator described in Patent Literature 1 includes a core-sheet laminate, a coating film, a stator coil, and a bobbin. The core-sheet laminate is formed by laminating a plurality of core sheets made of metal plates. The coating film is made of an insulating paint coated on a surface of the core-sheet laminate. The stator coil is made of a conductive wire (winding) wound around the core-sheet laminate via the coating film. The bobbin is inserted between the coating film and the stator coil. The bobbin prevents the conductive wire of the stator coil from contacting to the coating film that is coated on edge portions of the core-sheet laminate. Alternatively, the bobbin relieves pressure caused by the contact.

Incidentally, in the stator of the conventional example, the conductive wire (winding) of the stator coil may be displaced when wound around the core-sheet laminate.

CITATION LIST

Patent Literature

Patent Literature 1: WO 2012/114508 A1

SUMMARY OF INVENTION

It is an object of the present disclosure to provide a stator configured to suppress a winding to be displaced, a method for manufacturing the stator, and a brushless motor.

A stator according to an aspect of the present disclosure includes a plurality of stator blocks aligned along a circumferential direction and a plurality of coils each made of a winding wound around a corresponding one of the plurality of stator blocks. The stator includes a plurality of insulation members electrically insulating the plurality of stator blocks from the plurality of coils for respective groups of the plurality of stator blocks and the plurality of coils. Each of the plurality of stator blocks includes a yoke portion located at its outermost perimeter, a teeth portion protruding from an inner peripheral surface of the yoke portion, and an insulating portion being electrically insulating and covering a surface of the teeth portion. Each of the plurality of insulation members includes a pair of insulating plates and alignment portions each provided on a corresponding one of the pair of insulating plates and configured to align the winding. The pair of insulating plates are arranged to face each other across the teeth portion.

A method for manufacturing a stator of an aspect of the present disclosure includes providing the plurality of coils by winding the winding around the plurality of stator blocks, aligning the plurality of stator blocks provided with the plurality of coils along a circumferential direction, and bonding the plurality of stator blocks aligned in the circumferential direction.

A brushless motor according to an aspect of the present disclosure includes the stator and a rotor rotatably disposed in the stator.

BRIEF DESCRIPTION OF DRAWINGS

FIG. 2 is a perspective view of the stator;

FIG. 3 is a perspective view of the stator;

FIG. 7 is a front view a stator block and an insulation member of a second variation of the stator;

DESCRIPTION OF EMBODIMENTS

Figure 1:
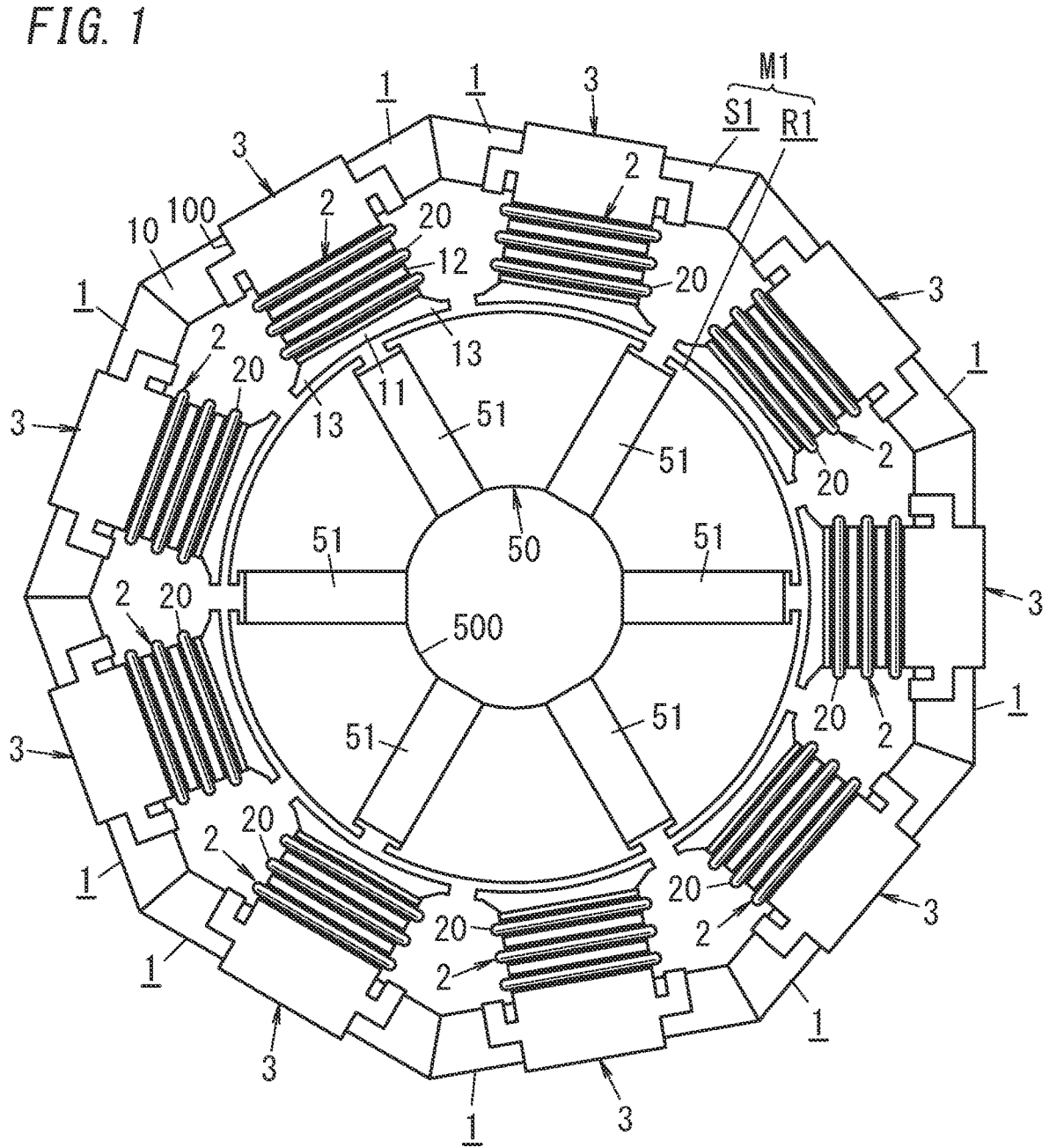
FIG. 1 is a front view of a stator and a brushless motor of an embodiment of the present disclosure.

A stator, a method for manufacturing the stator, and a brushless motor according to an embodiment of the present disclosure will be described in detail with reference to the drawings. Figures described in the embodiment described below are schematic views, and therefore, the ratio of sizes and the ratio of thicknesses of components in the drawings do not necessarily reflect actual dimensional ratios. Configurations described in the embodiment described below are a mere example of the present disclosure. The present disclosure is not limited to the embodiment described below. The embodiment may be modified in various manners depending on design or the like as long as the object of the present disclosure is achieved.

(1) Overview

As shown in FIG. 1, a brushless motor M1 according to an embodiment of the present disclosure (hereinafter abbreviated as a brushless motor M1) includes a stator S1 according to the embodiment of the present disclosure (hereinafter abbreviated as a stator S1) and a rotor R1 rotatably disposed in the stator S1.

The rotor R1 includes: a rotor core 50 made of a soft magnetism material and having a circular cylinder shape; and a plurality of (in the example shown in the figure, six) permanent magnets 51. The rotor core 50 has a shaft hole 500 having a circular cylinder shape and extending through the center thereof. Into the shaft hole 500, a rotation shaft (not shown) is to be inserted.

Each of the six permanent magnets 51 has a rectangular flat plate shape. The permanent magnets 51 are housed in the rotor core 50 such that the permanent magnets 51 are aligned at equal intervals along a circumferential direction of the rotor core 50.

The stator S1 includes: a plurality of (in the example shown in the figure, nine) stator blocks 1 aligned along the circumferential direction; and a plurality of coils 2 each made of a winding 20 wound around a corresponding one of the plurality of stator blocks 1 (see FIG. 1). Moreover, the stator S1 includes a plurality of (in the example shown in the figure, nine) insulation members 3 electrically insulating the plurality of stator blocks 1 from the plurality of coils 2 for respective groups of the plurality of stator blocks 1 and the plurality of coils 2.

Each of the plurality of stator blocks 1 includes: a yoke portion 10 located at its outermost perimeter; a teeth portion 11 protruding from an inner peripheral surface of the yoke portion 10; and an insulating portion 12 being electrically insulating and covering a surface of the teeth portion 11.

Each of the plurality of insulation members 3 includes a pair of insulating plates 30 and alignment portions 31 each provided on a corresponding one of the pair of insulating plates 30 and configured to align the winding 20. The pair of insulating plates 30 are arranged to face each other across the teeth portion 11.

Thus, when the plurality of coils 2 included in the stator S1 are excited, magnetic attractive force and magnetic repulsive force act between each stator block 1 and the rotor R1, and the rotor R1 is thus bidirectionally rotatable with respect to the stator S1. Thus, the rotation shaft inserted in the shaft hole 500 of the rotor R1 is also rotatable together with the rotor R1.

Here, in the plurality of stator blocks 1, when the displacement (positional displacement) of the winding 20 wound around each teeth portion 11 increases, variations in the magnetic attractive force and the magnetic repulsive force generated at each stator block 1 also increase even with the same magnitude of current flowing to the plurality of coils 2.

In contrast, in the stator S1, the alignment portions 31 provided on the insulation member 3 of each of the plurality of stator blocks 1 enable the winding 20 to be aligned with respect to, and wound around, a corresponding one of the teeth portions 11. As a result, in the stator S1, the winding 20 is easily aligned as compared with the case where no alignment portion 31 is provided, thereby suppressing the winding 20 from being displaced.

(2) Details of Stator

(2-1) Stator Block

The plurality of stator blocks 1 all have the same configuration. Note that in the following description, unless otherwise indicated, up/down, forward/backward, and left/right directions indicated by arrows in FIG. 2 are respectively defined as up/down, forward/backward, and left/right directions of each stator block 1.

Figure 2:
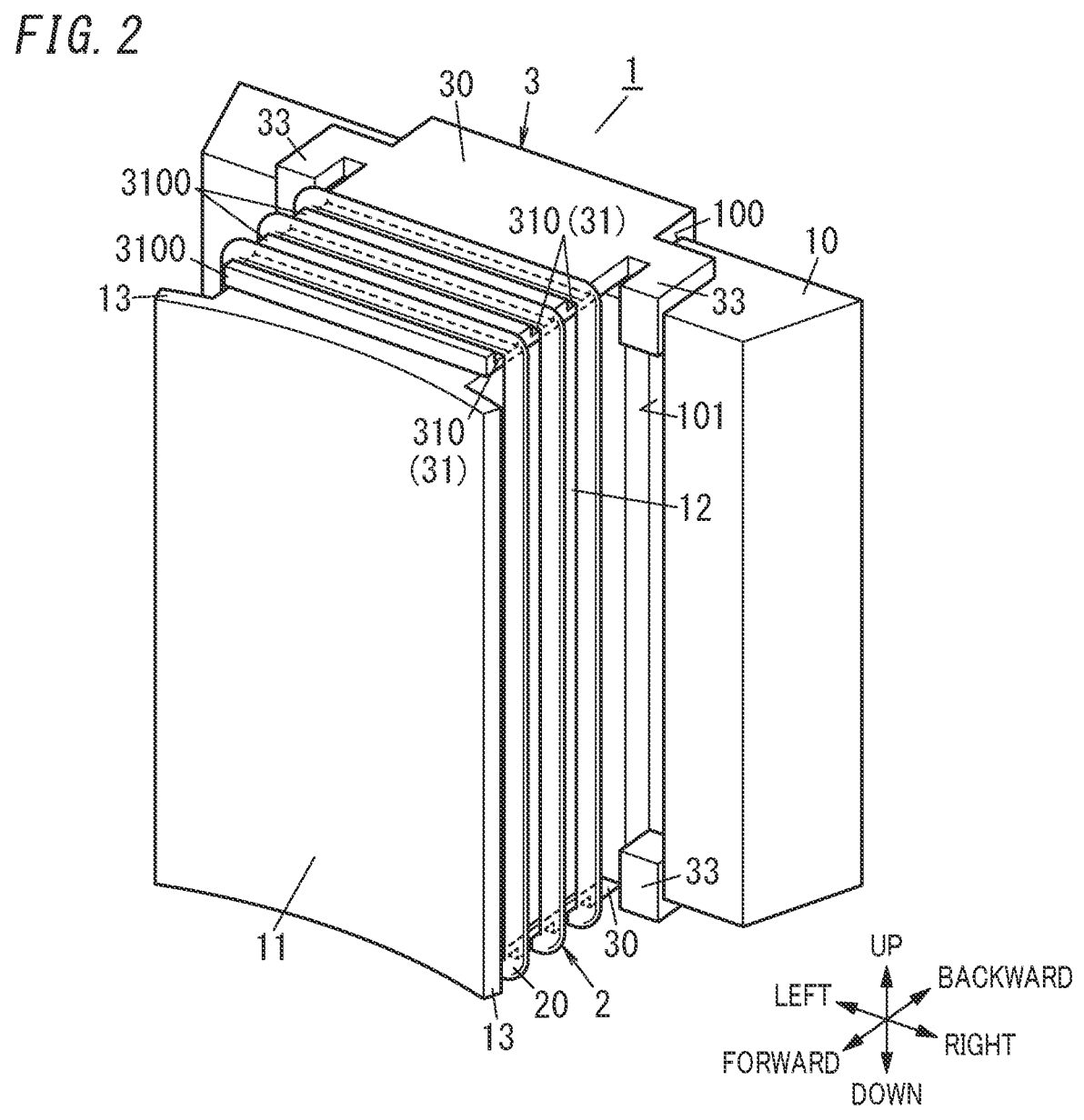
Figure 3:
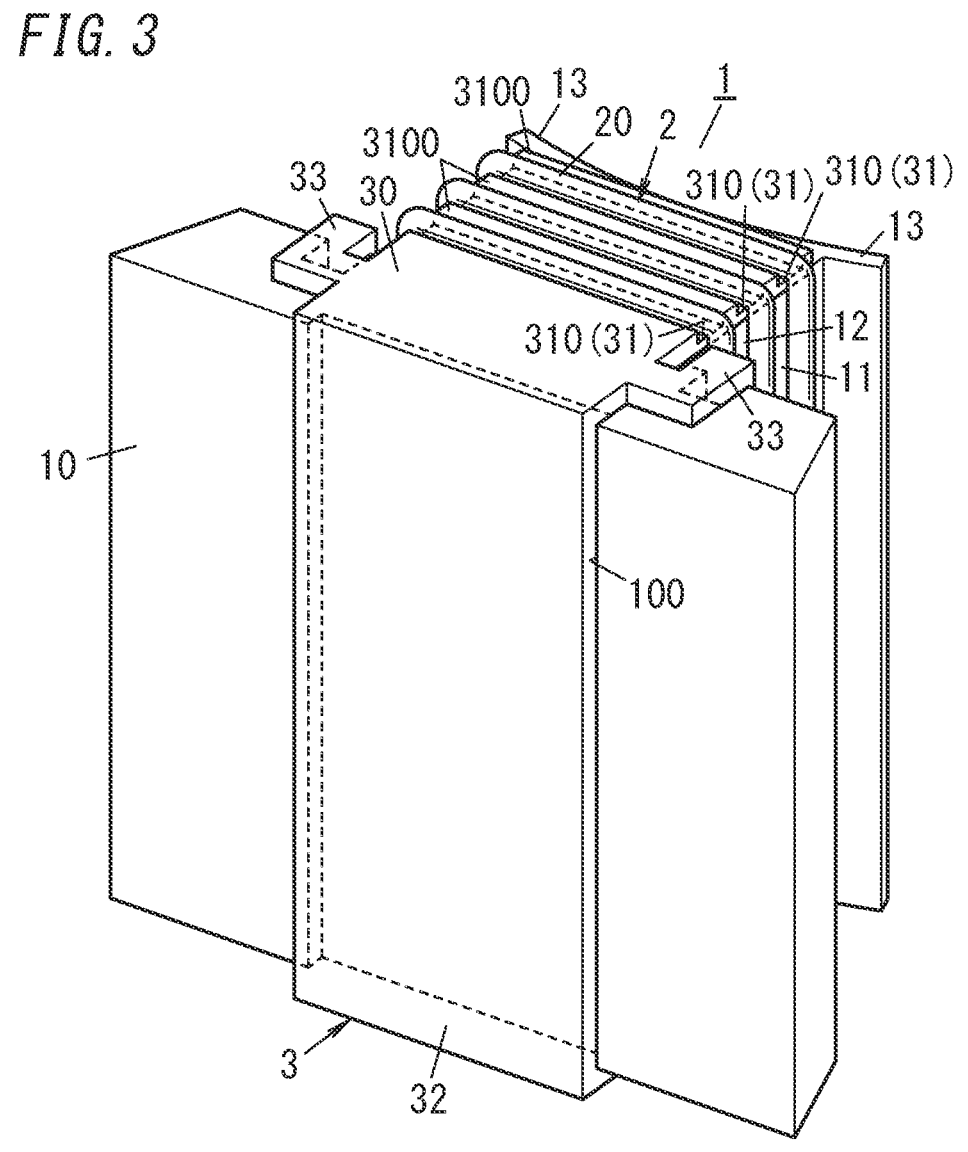

As shown in FIGS. 2 and 3, each stator block 1 includes the yoke portion 10, the teeth portion 11, the insulating portions 12, and flange portions 13.

The yoke portion 10 has a quadrangular prism shape. More specifically, the yoke portion 10 has a front surface, a rear surface, a left side surface, and a right side surface which are rectangular, and the yoke portion 10 has an upper surface and a lower surface which are trapezoidal. An upper side and a lower side of the front surface of the yoke portion

10 are respectively shorter than an upper side and a lower side of the rear surface of the yoke portion 10, and a left side and a right side of the front surface of the yoke portion 10 are respectively as long as a left side and a right side of the rear surface of the yoke portion 10.

The teeth portion 11 is in the shape of a rectangular parallelepiped. The height of the teeth portion 11 is equal to the height of the yoke portion 10. That is, an upper surface and a lower surface of the teeth portion 11 are respectively flush with the upper surface and the lower surface of the yoke portion 10. Moreover, the teeth portion 11 protrudes forward from the center in the left/right direction of the front surface of the yoke portion 10. Note that a front surface of the teeth portion 11 is curved like a circular cylinder (see FIGS. 1 and 2).

Each flange portion 13 has a plate shape whose longitudinal direction is in the up/down direction. The flange portions 13 protrude, from front ends of a left side surface and a right side surface of the teeth portion 11, one leftward and one rightward. The height of each flange portion 13 is equal to the height of the teeth portion 11. Note that a front surface of each flange portion 13 is curved like a circular cylinder to be flush with the front surface of the teeth portion 11.

Here, the yoke portion 10, the teeth portion 11, and the flange portions 13 are preferably made of a soft magnetism material such as a silicon steel sheet, ferrite, and an amorphous alloy, integrally as one piece. Alternatively, the yoke portion 10, the teeth portion 11, and the flange portions 13 may be formed separately and may then be bonded together into one piece.

The insulating portions 12 are disposed on both the left and right side surfaces of the teeth portion 11 (see FIGS. 2 and 3). The insulating portions 12 are coating films coating both the left and right side surfaces of the teeth portion 11. Note that the coating films (insulating portions 12) are preferably made of, for example, a synthetic resin powder coating material being electrically insulating.

(2-2) Insulation Member

Each insulation member 3 includes the pair of insulating plates 30 and the alignment portions 31. Each insulation member 3 further includes a connecting portion 32, and fixing portions 33 (see FIGS. 1 to 3).

Each of the pair of insulating plates 30 has a rectangular flat plate shape. Note that the pair of insulating plates 30 have the same shape and the same dimension. The width dimension of each insulating plate 30 in the left/right direction (short direction) is greater than the width dimension of the teeth portion 11 in the left/right direction and is less than the width dimension of the yoke portion 10 in the left/right direction. The width dimension of the insulation member 3 in the forward/backward direction (longitudinal direction) is slightly less than the width dimension of the stator block 1 in the forward/backward direction (see FIG. 1). Note that one of the pair of insulating plates 30 is disposed on an upper surface of the stator block 1, and the other of the pair of insulating plates 30 is disposed under a lower surface of the stator block 1.

The connecting portion 32 has a rectangular flat plate shape. One end (upper end) of the connecting portion 32 in the longitudinal direction is connected to a rear end of the insulating plate 30 disposed on the upper surface of the stator block 1. The other end (lower end) of the connecting portion 32 in the longitudinal direction is connected to a rear end of the insulating plate 30 disposed under the lower surface of the stator block 1. That is, the pair of insulating plates 30 are connected to each other at their rear ends by the connecting portion 32 (see FIGS. 2 and 3). Moreover, the connecting portion 32 is fitted to a groove 100 provided in the rear surface of the yoke portion 10 (see FIG. 3). At the center of the rear surface of the yoke portion 10 in the left/right direction, the groove 100 extends over the entire length of the yoke portion 10 in the up/down direction. Note that the pair of insulating plates 30 and the connecting portion 32 are preferably integrally made of an electrically insulating synthetic resin material.

Two fixing portions 33 are provided at each of the pair of insulating plates 30. Each fixing portion 33 has a hook shape viewed in the left/right direction (see FIG. 2). At both left and right side surfaces of each insulating plate 30, the fixing portions 33 protrude, from locations between the center and a back side of each insulating plate 30 in the forward/ backward direction, one leftward and one rightward. Tip ends of the two fixing portions 33 of an upper insulating plate 30 protrude downward. In contrast, tip ends of the two fixing portions 33 of a lower insulating plate 30 protrude upward (see FIG. 2).

The alignment portions 31 have a plurality of recesses 310 formed in the pair of insulating plates 30 (see FIGS. 1 to 3). The plurality of recesses 310 (alignment portions 31) are formed in each of an upper surface of the upper insulating plate 30 and a lower surface of the lower insulating plate 30. Note that the plurality of recesses 310 are formed by a plurality of ribs 3100 protruding upward from the upper surface of the upper insulating plates 30. That is, on the upper surface of the upper insulating plate 30 and the lower surface of the lower insulating plate 30, the plurality of ribs 3100 are provided at constant intervals in the forward/ backward direction. Each recess 310 is formed by a space between a pair of adjacent ribs 3100 in the forward/back- ward direction of each of the upper surface of the upper insulating plate 30 and the lower surface of the lower insulating plate 30. Note that the width of each recess 310 (space between a pair of adjacent ribs 3100) may be slightly greater than the wire diameter (diameter) of the winding 20 of the coil 2 or may be less than or equal to the wire diameter of the winding 20. The plurality of recesses 310 may be grooves formed in the upper surface of the upper insulating plate 30 and the lower surface of the lower insulating plate 30.

(2-3) Coil

Each coil 2 includes, for example, the winding 20 made of a conductor such as copper or a copper alloy. Each coil 2 includes the winding 20 wound around the teeth portion 11 and the pair of insulating plates 30. The winding 20 is aligned by the alignment portions 31 provided on each of the insulating plates 30. That is, the winding 20 is housed in each of the plurality of recesses 310 formed in the upper surface of the upper insulating plate 30 and the plurality of recesses 310 formed in the lower surface of the lower insulating plate 30, and thereby the winding 20 is aligned (see FIGS. 1 to 3).

Here, each of the pair of insulating plates 30 has a width greater than the width of the teeth portion 11. For example, each insulating plate 30 preferably has a width greater than the width of the teeth portion 11 by about 0.3 mm. Each of the pair of insulating plates 30 has a width greater than the width of the teeth portion 11, thereby securing an insulation distance between the winding 20 and each of both the left and right side surfaces of the teeth portion 11. Thus, a bobbinless coil 2 can be embodied.

Here, both the left and right side surfaces of the teeth portion 11 are covered with the insulating portions 12. Therefore, even when the width dimension of each of the pair of insulating plates 30 is less than or equal to the width dimension of the teeth portion 11, the pair of insulating plates 30 and the insulating portions 12 on both the left and right side surfaces of the teeth portion 11 can secure the insulation dimension between the winding 20 and the teeth portion 11. Note that in FIGS. 1 to 3, the number of winding turns of the coil 2 is three (three turns) but may be four (four turns) or more. Moreover, when the winding 20 is covered with an insulator, the winding 20 may be wound on one another to form two or more layers.

(3) Manufacturing Method of Stator

Next, a manufacturing method of the stator S1 will be described. Note that the manufacturing method described below is a mere example, and the order of some steps may be exchanged. Note that the manufacturing method described below is automated by various manufacturing devices, but some steps may be manually performed by a person. Moreover, the explanation of the manufacturing method of the stator blocks 1 will be omitted.

The manufacturing method of the stator S1 of the present embodiment (hereinafter, abbreviated as a manufacturing method) includes at least a first step, a second step, a third step, and a fourth step.

The first step is a step of attaching each insulation member 3 to a corresponding one of the stator blocks 1. First of all, the connecting portion 32 is warped to increase the distance between the pair of insulating plates 30, and the yoke portion 10 is covered with the insulation member 3 from the back of the stator block 1. When force warping the connecting portion 32 is removed, the connecting portion 32 is fitted in the groove 100 in the rear surface of the yoke portion 10, and the tip ends of the pair of fixing portions 33 of each insulating plate 30 are fitted to recesses 101 at both left and right ends of the front surface of the yoke portion 10 (see FIGS. 2 and 3). Thus, each insulation member 3 is attached to the corresponding one of the stator blocks 1.

The second step is a step of winding the winding 20 around each of the plurality of stator blocks 1 to provide the coil 2. The winding 20 is wound by, for example, a winding machine. As already described, the winding 20 is housed in the recesses 310 of the alignment portions 31 provided on the pair of insulating plates 30 and is wound around the teeth portion 11 of the stator block 1.

The third step is a step of aligning the plurality of stator blocks 1 each provided with the coil 2 along a circumfer- ential direction. As shown in FIG. 1, the nine stator blocks 1 are aligned in a ring shape such that the left side surfaces of each yoke portion 10 is in contact with the right side surface of a corresponding one of the yoke portions 10.

The fourth step is a step of bonding together the nine stator blocks 1 aligned along the circumferential direction. Specifically, the yoke portions 10 of two stator blocks 1 adjoining each other are bonded to each other by an appro- priate method such as welding or adhesion. Then, all of the nine stator blocks 1 are bonded, thereby completing the stator S1.

Thus, according to the manufacturing method of the present embodiment, the winding 20 is aligned by the alignment portions 31 provided on the pair of insulating plates 30, and therefore, the displacement of the winding 20 can be suppressed also during winding of the winding 20.

Figure 4:
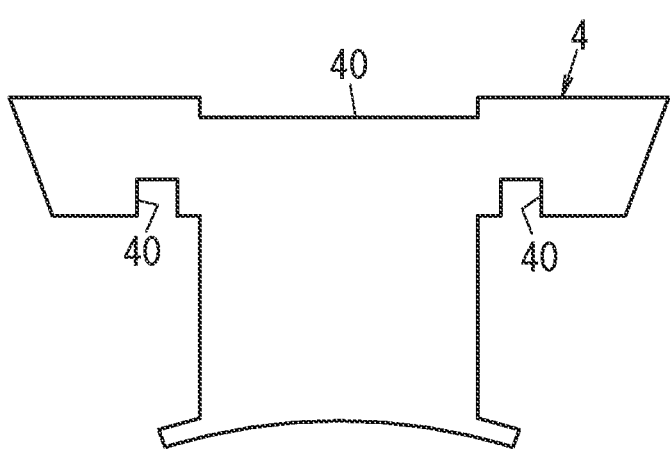
FIG. 4 is a front view of a plate member of the stator.

Incidentally, each stator block 1 may include a plurality of plate members 4 stacked one on top of another in a thickness direction defined with respect to the plate members 4. As shown in FIG. 4, each of the plurality of plate members 4 has the same shape as the shape of the upper surface of the stator block 1. Note that the groove 100 and the recesses 101 of the yoke portion 10 are cut-outs 40 formed in the plate members 4. The plurality of plate members 4 stacked one on top of another in the thickness direction are bonded to each other by an appropriate method such as welding or adhesion, thereby providing the stator block 1.

As described above, when each stator block 1 is configured as a laminate of the plurality of plate members 4, the groove 100 and the recesses 101 of the yoke portion 10 may be the cut-outs 40 of the plate members 4. Therefore, the groove 100 and the recesses 101 are easily formed as compared with the case where the groove 100 and the recesses 101 are directly formed in the yoke portion 10.

(4) Variations of Stator

Next, variations of the stator S1 according to the embodiment will be described.

(4-1) First Variation

A stator S1 of a first variation is distinctive in terms of the configuration of the alignment portions 31 of each of the plurality of insulation members 3.

Figure 5:
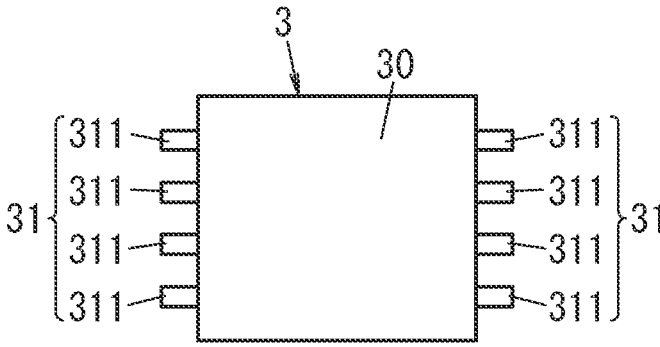
FIG. 5 is a front view of an insulation member of a first variation of the stator, where part of the insulation member is omitted.
Figure 6:
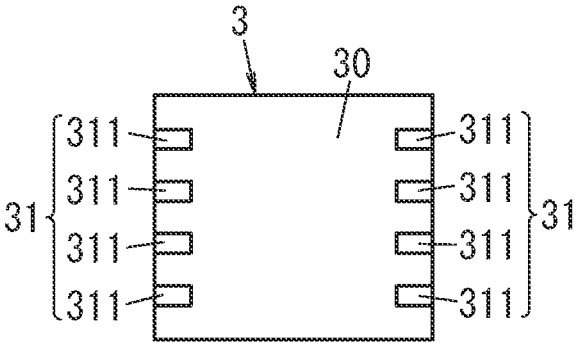
FIG. 6 is a front view of an insulation member of a first variation of the stator, where part of the insulation member is omitted.

As shown in FIGS. 5 and 6, the alignment portions 31 of the first variation include a plurality of projections 311 provided on each of the pair of insulating plates 30. The plurality of projections 311 are aligned at constant intervals along the forward/backward direction of each insulating plate 30. Note that as shown in FIG. 5, the plurality of projections 311 protrude leftward and rightward respectively from the left side surface and the right side surface of each insulating plate 30. Alternatively, as shown in FIG. 6, the plurality of projections 311 may protrude upward and downward respectively from both left and right ends of an upper surface of the upper insulating plate 30 and a lower surface of the lower insulating plate 30.

Thus, a winding (not shown) is housed between the plurality of projections 311 and is wound around the teeth portion of the stator block. In the stator S1 of the first variation, the alignment portions 31 include a plurality of projections 311, and thus, the alignment portions 31 are easily provided on the insulating plates 30.

(4-2) Second Variation

A stator S1 of a second variation is distinctive in terms of an attachment structure of each insulation member 3 to a corresponding one of the stator block 1.

Figure 7:
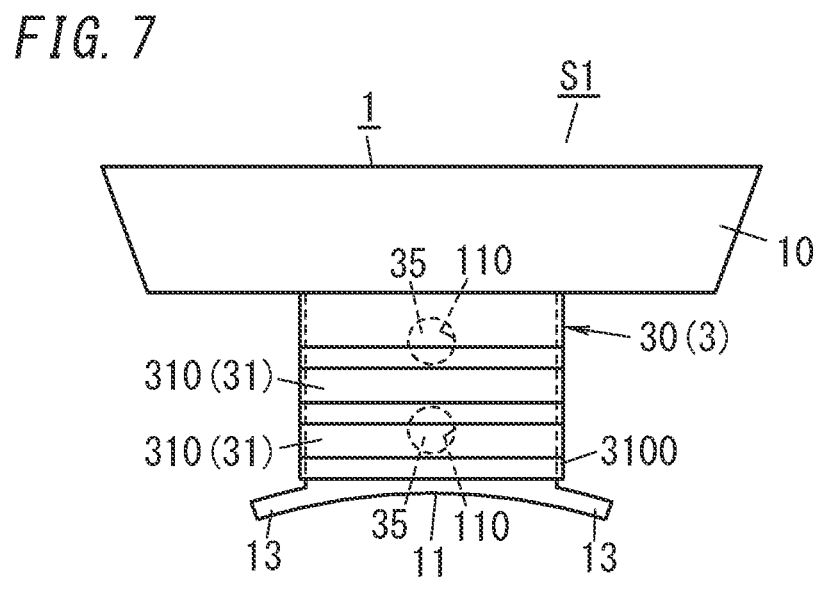
Figure 8:
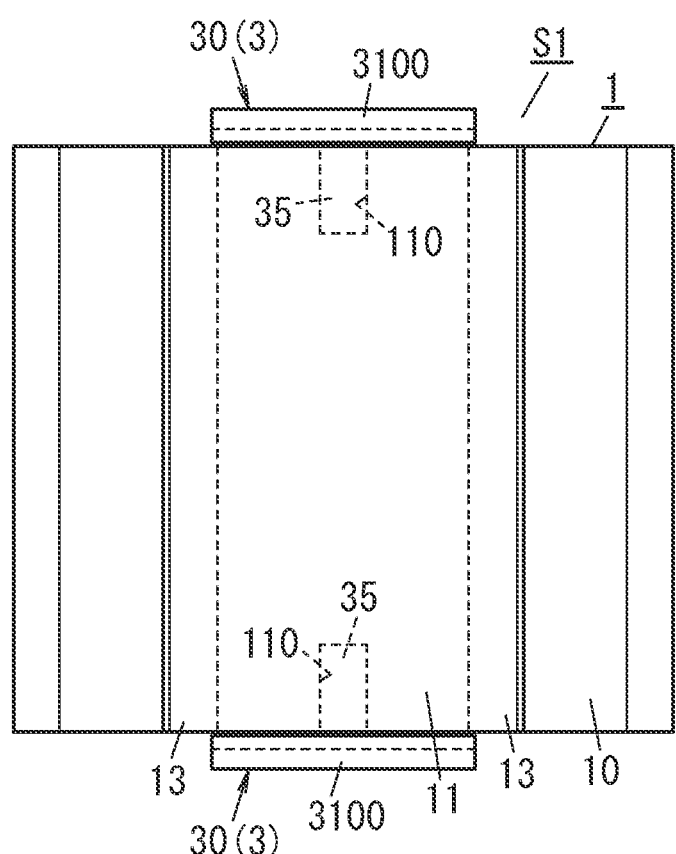
FIG. 8 is a plan view of the stator block and the insulation member of the second variation.
Figure 9:
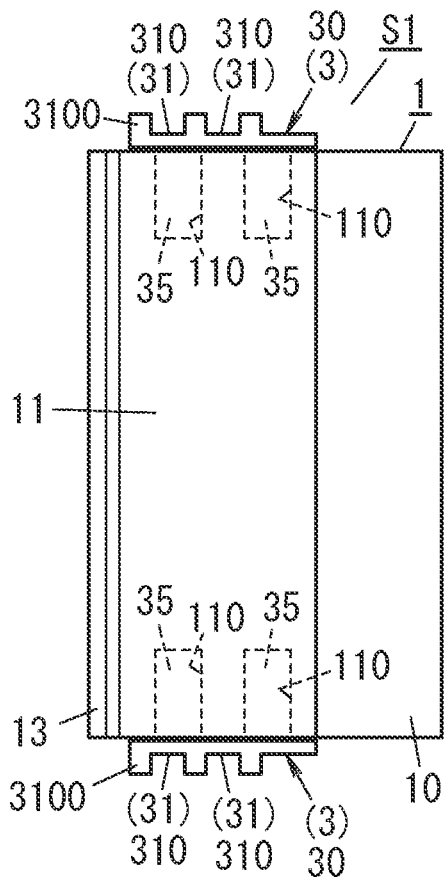
FIG. 9 is a side view of the stator block and the insulation member of the second variation.

As shown in FIGS. 7 to 9, each insulation member 3 of the second variation include no connecting portion for connecting the pair of insulating plates 30 to each other. Moreover, each insulation member 3 in the second variation includes a fixing portion in place of the fixing portions 33 each having a hook shape. The fixing portion includes a pair of projections 35 protruding downward from the lower surface of the upper insulating plate 30 and a pair of projections 35 protruding upward from the upper surface of the lower insulating plate 30.

Each projection 35 has a column shape. The projections 35 protrude from the upper surface or the lower surface of the insulating plate 30 such that the projections 35 are spaced from each other in the forward/backward direction. Note that each projection 35 is preferably made of a synthetic resin material and is formed integrally with the insulating plate 30.

On the other hand, each stator block 1 in the second variation has two holes 110 in each of the upper surface and the lower surface of the teeth portion 11. To the two holes 110, the pair of projections 35 of each insulating plate 30 are to be fitted on a one-to-one basis. An inner peripheral surface of each of the holes 110 is formed in a hollow circular cylindrical shape. To the two holes 110 formed in the upper surface of the teeth portion 11, the pair of projections 35 provided on the upper insulating plate 30 are fitted on a one-to-one basis. Similarly, to two holes 110 formed in the lower surface of the teeth portion 11, the pair of projections 35 provided on the lower insulating plate 30 are fitted on a one-to-one basis. Note that each projection 35 is preferably fixed to the teeth portion 11 by an appropriate method such as welding or adhesion. Alternatively, a rib protrudes from a circumferential surface of each projection 35, and each projection 35 is pressed into the hole 110 such that the rib is crushed, thereby fixing the insulating plate 30 to the stator block 1.

Thus, the stator S1 of a second variation is downsized by simplifying the structure of the plurality of insulation members 3.

Figure 10:
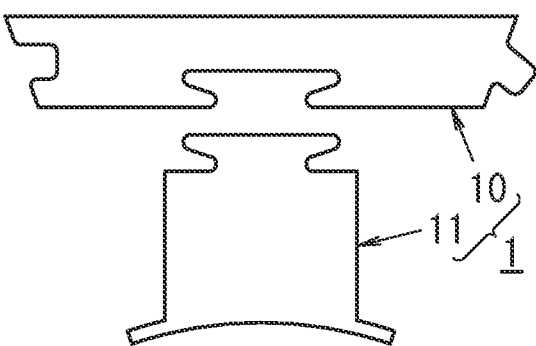
FIG. 10 is a front view of another configuration of the stator block in the second variation of the stator.

Note that when in the stator block 1 of the second variation, the yoke portion 10 and the teeth portion 11 are separate from each other as shown in FIG. 10, the teeth portion 11 having the winding 20 wound therearound is wound via the pair of insulating plates 30 may be bonded to the yoke portion 10.

(4-3) Third Variation

Figure 11:
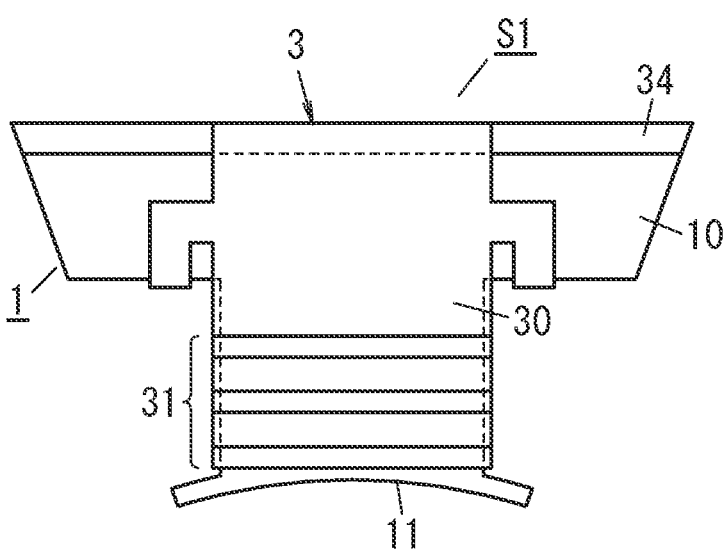
FIG. 11 is a front view a stator block and an insulation member of a third variation of the stator.
Figure 12:
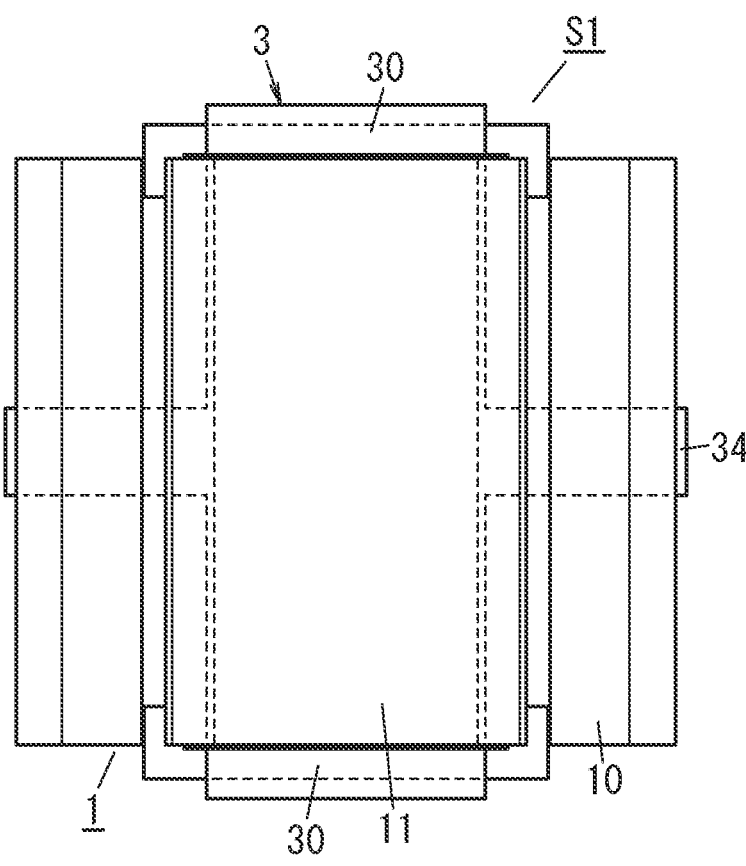
FIG. 12 is a plan view of the stator block and the insulation member of the third variation.
Figure 13:
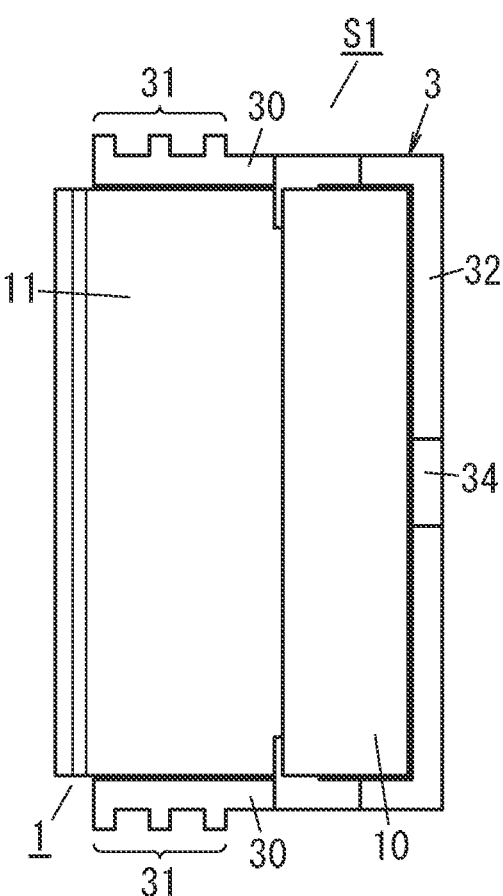
FIG. 13 is a side view of the stator block and the insulation member of the third variation.

A stator S1 of a third variation is distinctive in terms of the structure of the plurality of insulation members 3. Each of the plurality of insulation members 3 of the third variation further includes bonding portions 34 bonding its connecting portion 32 to adjacent connecting portions 32 (FIGS. 11 to 13).

Each bonding portion 34 has a prism shape. The bonding portions 34 protrude, from center locations on both left and right side surfaces of the connecting portion 32 in the up/down direction, one leftward and one rightward. Moreover, tip end surfaces (a left side surface and a right side surface) of the bonding portions 34 are tilted rearward to be flush with the left and right side surfaces of the yoke portion 10 respectively (see FIG. 11).

Figure 14:
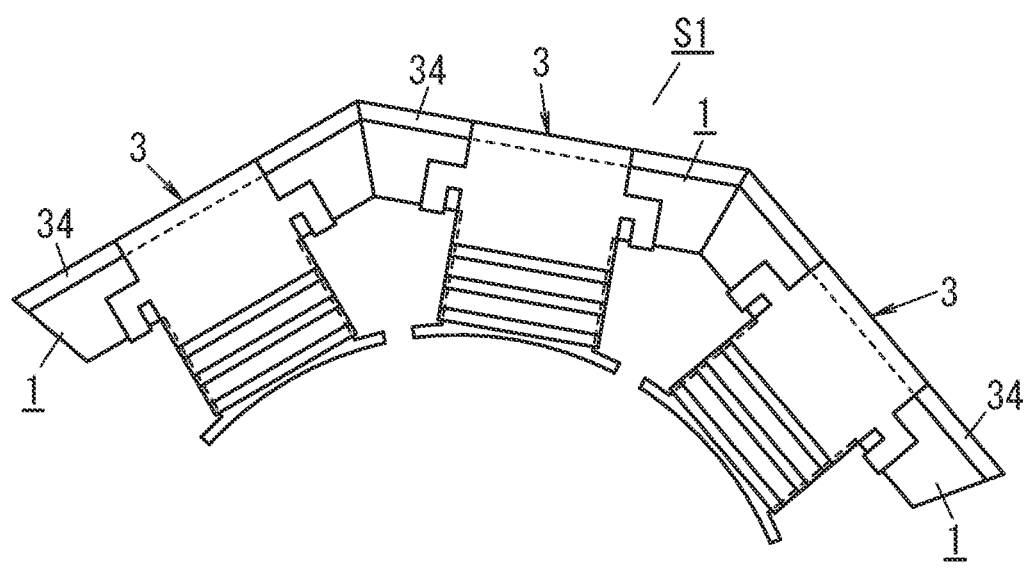
FIG. 14 is a front view of a stator of the third variation, where part of the stator is omitted.

In the stator S1 of the third variation, the bonding portions 34 of the insulation members 3 adjacent to each other are bonded to each other by an appropriate method such as adhesion (see FIG. 14). That is, the stator S1 of the third variation simplifies manufacturing steps of the stator S1 as compared with the yoke portions 10 of the stator blocks 1 adjacent to each other are bonded.

(4-4) Fourth Variation

A stator S1 of a fourth variation is distinctive in terms of the structures of the plurality of stator blocks 1 and the insulation members 3.

Figure 15:
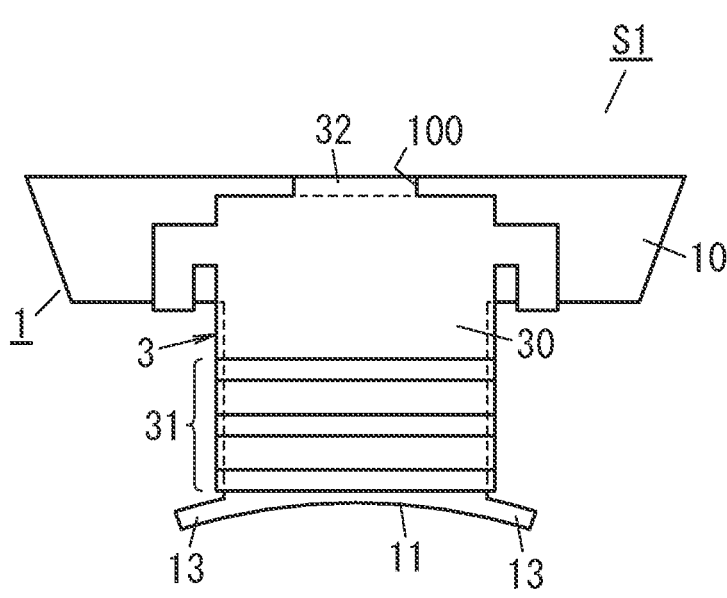
FIG. 15 is a front view of a fourth variation of the stator, where part of the stator is omitted.

In the stator S1 of the fourth variation, the width dimension (length dimension in the left/right direction) of the connecting portion 32 in each of the plurality of insulation members 3 is smaller than the width dimension (width dimension in the left/right direction) of the teeth portion 11 of the stator block 1 (see FIG. 15). Moreover, the stator S1 of the fourth variation is configured such that the width dimension (width dimension in the left/right direction) of the groove 100 formed in an outer peripheral surface (the rear surface) of the yoke portion 10 is smaller than the width dimension of the teeth portion 11 and is greater than or equal to the width dimension of the connecting portion 32. Further, in the stator S1 of the fourth variation, the depth (depth in the forward/backward direction) of the groove 100 is greater than or equal to the thickness (thickness in the forward/backward direction) of the connecting portion 32.

Thus, in the stator S1 of the fourth variation, the width dimension of the connecting portion 32 and the width dimension of the groove 100 are each smaller than the width dimension of the teeth portion 11, and therefore, a magnetic flux passing through the stator block 1 is hardly influenced by the connecting portion 32. Moreover, in the stator S1 of the fourth variation, the depth of the groove 100 is greater than or equal to the thickness of the connecting portion 32, and therefore, the connecting portion 32 does not protrude from the outer peripheral surface of the yoke portion 10. As a result, the stator S1 of the fourth variation is downsized in the radial direction (forward/backward direction of the stator block 1).

(5) Other Advantages of Stator

In each of the plurality of insulation members 3 of the stator S1, each of the pair of insulating plate 30 has a width greater than the width of the teeth portion 11, and the pair of insulating plate 30 are arranged to face each other across the teeth portion 11. That is, when the winding 20 is wound around the teeth portion 11 via the pair of insulating plates 30, a space is automatically formed between the winding 20 and each of both the left and right side surfaces of the teeth portion 11. Thus, the stator S1 can secure the insulation distance between the teeth portion 11 and the winding 20 without using a bobbin. Moreover, the stator S1 includes the insulating portions 12 on both the left and light side surfaces of the teeth portion 11 which are facing the winding 20, and therefore, the insulating portions 12 further increases the insulation distance between the teeth portion 11 and the winding 20. Note that the stator S1 algins the winding 20 by using the alignment portions 31 of the insulation members 3, and therefore, the stacking factor of the coil 2 can be increased without using a bobbin.

Moreover, the pair of insulating plates 30 of each insulation member 3 are connected to each other by the connecting portion 32, thereby improving the workability of work of attaching the insulation member 3 to the stator block 1. Note that the connecting portion 32 is disposed at a location such that the connecting portion 32 faces the outer peripheral surface of the yoke portion 10. This eliminates the influence of the connecting portion 32 over a gap (see FIG. 1) between the stator S1 and the rotor R1.

(6) Summary

A stator (S1) of a first aspect of the present disclosure includes a plurality of stator blocks (1) aligned along a circumferential direction and a plurality of coils (2) each made of a winding (20) wound around a corresponding one of the plurality of stator blocks (1). The stator (S1) of the first aspect includes a plurality of insulation members (3) electrically insulating the plurality of stator blocks (1) from the plurality of coils (2) for respective groups of the plurality of stator blocks (1) and the plurality of coils (2). Each of the plurality of stator blocks (1) includes a yoke portion (10) located at its outermost perimeter and a teeth portion (11) protruding from an inner peripheral surface of the yoke portion (10), and an insulating portion (12) covering the teeth portion (11) which is electrically insulating. Each of the plurality of insulation members (3) includes a pair of insulating plates (30) and alignment portions (31) each of which is provided on a corresponding one of the pair of insulating plates (30), the alignment portions (31) being configured to align the winding (20). The pair of insulating plates (30) are arranged to face each other across the teeth portion (11).

The stator (S1) of the first aspect enables the winding (20) to be aligned with respect to, and to be wound around, each teeth portion (11), by the alignment portions (31) provided on each of the insulation members (3) in in a plurality of stator blocks (1). As a result, the stator (S1) of the first aspect enables the winding (20) to be easily aligned and the winding (20) to be suppressed from being displaced as compared with the case where no alignment portion (31) is provided.

A stator (S1) of a second aspect of the present disclosure can be implemented in combination with the first aspect. In the stator (S1) of the second aspect, the alignment portions (31) preferably include a plurality of recesses (310) formed in the pair of insulating plates (30) to house the winding (20) in each of the plurality of recesses (301) to align the winding (20).

In the stator (S1) of the second aspect, the winding (20) is easily aligned by the alignment portions (31).

A stator (S1) of a third aspect of the present disclosure can be implemented in combination with the second aspect. In the stator (S1) of the third aspect, the plurality of recesses (310) are parallel grooves formed in surfaces of the pair of insulating plates (30).

A stator (S1) of the third aspect enables an insulation distance of the winding (20) housed in the plurality of recesses (310) to be easily secured.

A stator (S1) of a fourth aspect of the present disclosure can be implemented in combination with the first aspect. In the stator (S1) of the fourth aspect, the alignment portions (31) preferably include a plurality of projections (311) provided on the pair of insulating plates (30) and is configured to house the winding (20) between the plurality of projections (311) to align the winding (20).

The stator (S1) of the fourth aspect enables the workability of work of aligning the winding (20) to be improved.

A stator (S1) of a fifth aspect of the present disclosure can be implemented in combination with any one of the first to fourth aspects. In the stator (S1) of the fifth aspect, each of the plurality of insulation members (3) preferably further includes a connecting portion (32) connecting the pair of insulating plates (30) to each other.

The stator (S1) of the fifth aspect improves the workability when each insulation member (3) is attached to a corresponding one of the stator blocks (1).

A stator (S1) of a sixth aspect of the present disclosure can be implemented in combination with the fifth aspect. In the stator (S1) of the sixth aspect, the connecting portion (32) is preferably arranged to face an outer peripheral surface of the yoke portion (10).

In the stator (S1) of the sixth aspect, the connecting portion (32) is not disposed between the stator block (1) and the rotor (R1), thereby eliminating the influence of the connecting portion (32) over a gap between the stator (S1) and the rotor (R1).

A stator (S1) of a seventh aspect of the present disclosure can be implemented in combination with the sixth aspect. In the stator (S1) of the seventh aspect, the outer peripheral surface of the yoke portion (10) preferably has a groove (100) configured to be fitted to the connecting portion (32).

In the stator (S1) of the seventh aspect, at least part of the connecting portion (32) is fitted to the groove (100), thereby reducing a projection dimension of the connecting portion (32) protruding from the outer peripheral surface of the yoke portion (10).

A stator (S1) of an eighth aspect of the present disclosure can be implemented in combination with the seventh aspect. In the stator (S1) of the eighth aspect, the connecting portion (32) has a width dimension along the circumferential direction, the width dimension of the connecting portion (32) being preferably smaller than a width dimension of the teeth portion (11) along the circumferential direction.

In the stator (S1) of the eighth aspect, a magnetic flux passing through each stator block (1) is hardly influenced by a corresponding one of the connecting portions (32).

A stator (S1) of a ninth aspect of the present disclosure can be implemented in combination with any one of the first to eighth aspects. In the stator (S1) of the ninth aspect, each of the plurality of insulation members (3) preferably includes at least one fixing portion (33) to be fixed to a corresponding one stator block (1) of the plurality of stator blocks (1).

The stator (S1) of the ninth aspect includes the fixing portions (33), thereby easily fixing the insulation members (3) to the respective stator blocks (1).

A stator (S1) of a tenth aspect of the present disclosure can be implemented in combination with the ninth aspect. In the stator (S1) of the tenth aspect, the at least one fixing portion (33) preferably has a hook shape and is configured to be hooked to the yoke portion (10).

The stator (S1) of the tenth aspect enables the at least one fixing portion (33) to be easily fixed to its corresponding yoke portion (10).

A stator (S1) of an eleventh aspect of the present disclosure can be implemented in combination with the tenth aspect. In the stator (S1) of the eleventh aspect, the yoke portion (10) preferably has a recess (101) formed in a part to which the at least one fixing portion (33) is to be hooked, the recess (101) being configured to house the at least one fixing portion (33).

In the stator (S1) of the eleventh aspect, the at least one fixing portion (33) is less likely to be an obstacle for winding the winding (20), and therefore, the workability of work of winding the winding (20) is improved.

A stator (S1) of a twelfth aspect of the present disclosure can be implemented in combination with the eleventh aspect. In the stator (S1) of the twelfth aspect, each of the plurality of stator blocks (1) preferably includes a plurality of plate members (4) stacked one on top of another in a thickness direction defined with respect to the plurality of plate members (4). The recess (101) is preferably a cut-out (40) formed in the plurality of plate members (4).

In the stator (S1) of the twelfth aspect, when the stator block (1) is configured as a laminate of the plurality of plate members (4), the recess (101) in the yoke portion (10) can be the cut-out (40) in the plate members (4). Thus, the stator (S1) of the twelfth aspect enables the recess (101) to be easily formed as compared with the case where the recess (101) is directly formed in the yoke portion (10).

A stator (S1) of a thirteenth aspect of the present disclosure can be implemented in combination with the ninth aspect. In the stator (S1) of the thirteenth aspect, the at least one fixing portion includes a plurality of fixing portions (projections 35), the plurality of fixing portions preferably protrudes, at least one by one, from the pair of insulating plates (30) toward the teeth portion (11), and the plurality of fixing portions are preferably configured to be fitted to respective holes (110) formed in the teeth portion (11).

In the stator (S1) of the thirteenth aspect, each pair of insulating plates (30) is easily fixed to a corresponding one of the teeth portions (11).

A stator (S1) of a fourteenth aspect of the present disclosure can be implemented in combination with any one of the fifth to eighth aspects. In the stator (S1) of the fourteenth aspect, each of the plurality of insulation members (3) preferably further includes a bonding portion (34) configured to bond the connecting portion (32) to the connecting portion (32) of an adjacent insulation member of the plurality of insulation members (3).

In the stator (S1) of the fourteenth aspect, the plurality of insulation members (3) are easily bonded to each other by the bonding portions (34).

A stator (S1) of a fifteenth aspect of the present disclosure can be implemented in combination with an y one of the first to fourteenth aspects. In the stator (S1) of the fifteenth aspect, each of the pair of insulating plates (30) has a width greater than the teeth portion (11).

The stator (S1) of the fifteenth aspect enables the insulation distance between the teeth portion (11) and the winding (20) to be easily secured.

A manufacturing method of a stator of a sixteenth aspect of the present disclosure is a method of manufacturing the stator (S1) of any one of the first to fifteenth aspects. The manufacturing method of the sixteenth aspect includes winding a winding (20) around each of the plurality of stator blocks (1) to provide a coil (2). The manufacturing method of the sixteenth aspect includes aligning, along a circumferential direction, the plurality of stator blocks (1) each provided with the coil (2); and bonding the plurality of stator blocks (1) aligned along the circumferential direction.

The manufacturing method of the stator of the sixteenth aspect enables the winding (20) to be aligned with respect to, and wound around, a corresponding one of the teeth portions (11), and thus, the winding (20) is easily aligned, thereby suppressing the winding (20) from being displaced.

A brushless motor (M1) of a seventeenth aspect of the present disclosure includes the stator (S1) of any one of the first to fifteenth aspects and a rotor (R1) rotatably disposed in the stator (S1).

The brushless motor (M1) of the seventeenth aspect enables the winding (20) to be aligned with respect to, and to be wound around, each teeth portion (11), and therefore, the brushless motor (M1) enables the winding (20) to be easily aligned and to suppress the winding (20) from being displaced.

REFERENCE SIGNS LIST

M1 Brushless Motor
S1 Stator
R1 Rotor
1 Stator Block
2 Coil
3 Insulation Member
4 Plate Member
10 Yoke Portion
11 Teeth Portion
12 Insulating portion
20 Winding
30 Insulating Plate
31 Alignment Portion
32 Connecting Portion
33 Fixing Portion
34 Bonding portion
35 Projection (Fixing Portion)
40 Cut-Out
100 Groove
101 Recess

110 Hole
310 Recess
311 Projection

The invention claimed is:

1. A stator comprising:
a plurality of stator blocks aligned along a circumferential direction;
a plurality of coils each made of a winding wound around a corresponding one of the plurality of stator blocks; and
a plurality of insulation members electrically insulating the plurality of stator blocks from the plurality of coils for respective groups of the plurality of stator blocks and the plurality of coils,
each of the plurality of stator blocks including
a yoke portion located at its outermost perimeter,
a teeth portion protruding from an inner peripheral surface of the yoke portion, and
an insulating portion being electrically insulating and covering a surface of the teeth portion,
each of the plurality of insulation members including
a pair of insulating plates and
alignment portions each provided on a corresponding one of the pair of insulating plates and configured to align the winding,
the pair of insulating plates are arranged to face each other across the teeth portion,
each of the plurality of insulation members further including
a connecting portion connecting the pair of insulating plates to each other and
a bonding portion configured to bond its connecting portion to the connecting portion of a circumferentially adjacent insulation member of the plurality of insulation members.

2. The stator of claim 1, wherein
the alignment portions include a plurality of recesses formed in the pair of insulating plates to house the winding in the plurality of recesses to align the winding.

3. The stator of claim 2, wherein
the plurality of recesses are parallel grooves formed in surfaces of the pair of insulating plates.

4. The stator of claim 1, wherein
the alignment portions include a plurality of projections provided on the pair of insulating plates and is configured to house the winding between the plurality of projections to align the winding.

5. The stator of claim 1, wherein
the connecting portion is arranged to face an outer peripheral surface of the yoke portion.

6. The stator of claim 5, wherein
the outer peripheral surface of the yoke portion has a groove configured to be fitted to the connecting portion.

7. The stator of claim 6, wherein
the connecting portion has a width dimension along the circumferential direction, the width dimension of the connecting portion being smaller than a width dimension of the teeth portion along the circumferential direction.

8. The stator of claim 1, wherein
each of the plurality of insulation members includes at least one fixing portion to be fixed to a corresponding one stator block of the plurality of stator blocks.

9. The stator of claim 8, wherein
the at least one fixing portion has a hook shape and is configured to be hooked to the yoke portion.

10. The stator of claim 9, wherein
the yoke portion has a recess formed in a part to which the at least one fixing portion is to be hooked, the recess being configured to house the at least one fixing portion.

11. The stator of claim 10, wherein
each of the plurality of stator blocks includes a plurality of plate members stacked one on top of another in a thickness direction defined with respect to the plurality of plate members, and
the recess is a cut-out formed in the plurality of plate members.

12. The stator of claim 8, wherein
the at least one fixing portion includes a plurality of fixing portions,
the plurality of fixing portions protrudes, at least one by one, from the pair of insulating plates toward the teeth portion, and
the plurality of fixing portions are configured to be fitted to respective holes formed in the teeth portion.

13. The stator of claim 1,
each of the pair of insulating plates has a width greater than a width of the teeth portion.

14. A method of manufacturing the stator of claim 1, the method comprising:
providing the plurality of coils by winding a winding around each of the plurality of stator blocks;
aligning the plurality of stator blocks provided with the plurality of coils along a circumferential direction; and
bonding the plurality of stator blocks aligned along the circumferential direction.

15. The brushless motor comprising:
the stator of claim 1; and
a rotor rotatably disposed in the stator.

* * * * *